(12) United States Patent
Hauduc et al.

(10) Patent No.: US 6,859,820 B1
(45) Date of Patent: Feb. 22, 2005

(54) SYSTEM AND METHOD FOR PROVIDING LANGUAGE LOCALIZATION FOR SERVER-BASED APPLICATIONS

(75) Inventors: Ludovic Hauduc, Kirkland, WA (US); Tuna Ertemalp, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 09/704,067

(22) Filed: Nov. 1, 2000

(51) Int. Cl.[7] .............................................. G06F 15/16
(52) U.S. Cl. ........................ 709/203; 709/217; 709/246; 704/2
(58) Field of Search ................................. 709/203, 217, 709/245–246; 704/2–3, 8; 715/542

(56) References Cited

U.S. PATENT DOCUMENTS

| | | | |
|---|---|---|---|
| 6,297,819 B1 | | 10/2001 | Furst |
| 6,360,246 B1 | | 3/2002 | Begley et al. |
| 6,519,557 B1 | * | 2/2003 | Emens et al. .................. 704/8 |
| 6,718,519 B1 | * | 4/2004 | Taieb ......................... 715/542 |
| 2001/0051998 A1 | * | 12/2001 | Henderson ................... 709/217 |
| 2002/0002452 A1 | * | 1/2002 | Christy et al .................. 704/3 |
| 2002/0049831 A1 | | 4/2002 | Planter et al. |
| 2002/0062396 A1 | * | 5/2002 | Kakei et al ................. 709/246 |
| 2002/0077712 A1 | * | 6/2002 | Safaei et al. .................. 700/93 |
| 2002/0112093 A1 | | 8/2002 | Slotznick |
| 2002/0138649 A1 | * | 9/2002 | Cartmell et al. ............ 709/245 |
| 2002/0193983 A1 | * | 12/2002 | Tokieda et al. ................ 704/2 |

* cited by examiner

*Primary Examiner*—Wen-Tai Lin
(74) *Attorney, Agent, or Firm*—Perkins Coie LLP (57) ABSTRACT

Using a server in a distributed computer network to provide an application to a client in the client's preferred language through the use of software modules that translate the application. A client accesses an application on a server and provides a preferred language for the application. Software modules on the server take the content of the application and convert it into the language desired by the client. The translated application is then sent to the client. This approach eliminates the need to create separate applications for each language and allows the client to change languages instantaneously.

8 Claims, 6 Drawing Sheets

SYSTEM AND METHOD FOR PROVIDING LANGUAGE LOCALIZATION FOR SERVER-BASED APPLICATIONS

TECHNICAL FIELD

The present invention is generally directed to providing application content in a distributed computing environment in a variety of different languages. More specifically, the present invention supports a server-based translation of content of an application without altering the code for the application and without reproducing separate versions of the application in desired languages.

BACKGROUND OF THE INVENTION

The Internet has quickly become a popular means for transmitting information because of the world-wide access it provides to information resources. The information on the Internet is available in a variety of formats and it can have educational, entertainment, or business purposes. The World Wide Web (the "Web") is one of the largest and most popular distributed computing networks that make-up the Internet. The Web comprises interconnected computers from around the world. A computer connected to the Internet can download digital information from Web server computers. The Web comprises resources and clients that communicate digital information and instructions typically using a format known as Hypertext Markup Language (HTML). These instructions can include information for formatting text, linking to digital data, and receiving digital data.

One of the assets of the Web, world-wide interconnectivity, can also be an obstacle in that people around the world speak different languages. The information generated by Web server computers is typically in one language. This limits the usefulness and value of the Web server computer on a global scale.

The conventional approach to solving this problem is to design a single Web page in one language that permits a client to choose a language from a limited list of languages supported by the site. Copies of the Web applications are reproduced in the languages supported by the site. Once the client makes a language selection, it is directed to one set of the Web applications in the chosen language.

There are limitations with the conventional approach. First, this is a labor-intensive solution in that separate sets of Web applications must be created for each language. Any time the Web application is changed or updated, each version of the Web application must be changed to make that language's version current. Maintaining a separate version of the Web application for each language is time consuming and limits the practical ability to support many different languages. The conventional approach also does not allow a client to change languages in the midst of using a Web application, but requires the client to return to the beginning of the Web application. The client then chooses the alternate language and proceeds from the beginning of that version of the Web application.

In view of the foregoing, there is a need in the art for a method and system which will allow Web applications to support many different languages. Specifically, there is a need for Web applications to provide content in various languages without separate versions of the application for each language. There is a further need to change Web applications and keep them current without having to alter the same element in each language version of a Web application. Finally, a need exists in the art for a client to change languages at any point in using a Web application without having to return to the beginning of the Web application and repeat steps in another language.

SUMMARY OF THE INVENTION

The present invention is generally directed to software modules operating in a distributed computing environment. Specifically, the invention is designed to operate on a wide area network such as the World Wide Web (the "Web"). The Web comprises Web pages or Web applications that reside on computer servers in a network and that can be accessed by clients.

The present invention can provide the content of a Web application in different languages, called localization, by using language packs maintained at the server. The invention enables the conversion of the elements that make-up the content of the application into various languages without altering the underlying code of the application.

The present invention operates in a distributed computing environment with at least one server and clients connected to the server. To enable the client to receive an application in a desired language, the server determines the client's language preference. Using the appropriate language pack, the server can convert the application content to the client's preferred language. Upon completing the translation, the server can send the localized content to the client.

Existing Web applications do not permit efficient conversion of content into many languages. The conventional approach involves creating a homepage in one language and then providing links from the homepage to duplicate sets of Web pages. Each duplicate set is translated into a different language. In contrast, the present invention requires only, one set of Web pages for the specific Web application. The single application contains elements that make-up the content of the application and are encoded as strings. The localization process at the server takes these string elements and replaces them with the content of a specific language. Localization is accomplished with software modules, called language packs, residing on a server. Language packs can convert the content of the Web pages into the desired language and render the translated content for the Web client. This approach permits the Web client to choose a new language whenever it desires and eliminates the need to create duplicate sets of Web pages for each language. The invention also facilitates updating the Web application in that changes in the computer code only need to be made once instead of in each language version.

DETAILED DESCRIPTION OF THE EXEMPLARY EMBODIMENTS

The present invention allows for the server-based translation of content for an application into a variety of different languages. Instead of having to create a different version of a particular application for every desired language, only one version is maintained on a server computer. Also residing on the server are files called language packs. Language packs contain the data for translating the application content into a desired language. When a client accesses an application residing on a server, it can choose a language for the application content to be displayed in. The data contained in the language packs is used to translate the application content. The translation is then sent to the client. The client can also choose to change the language translation while using the application without having to exit and return to the beginning of the application.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a central processing unit (CPU), memory storage devices for the CPU, display devices and input devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

Figure 1:
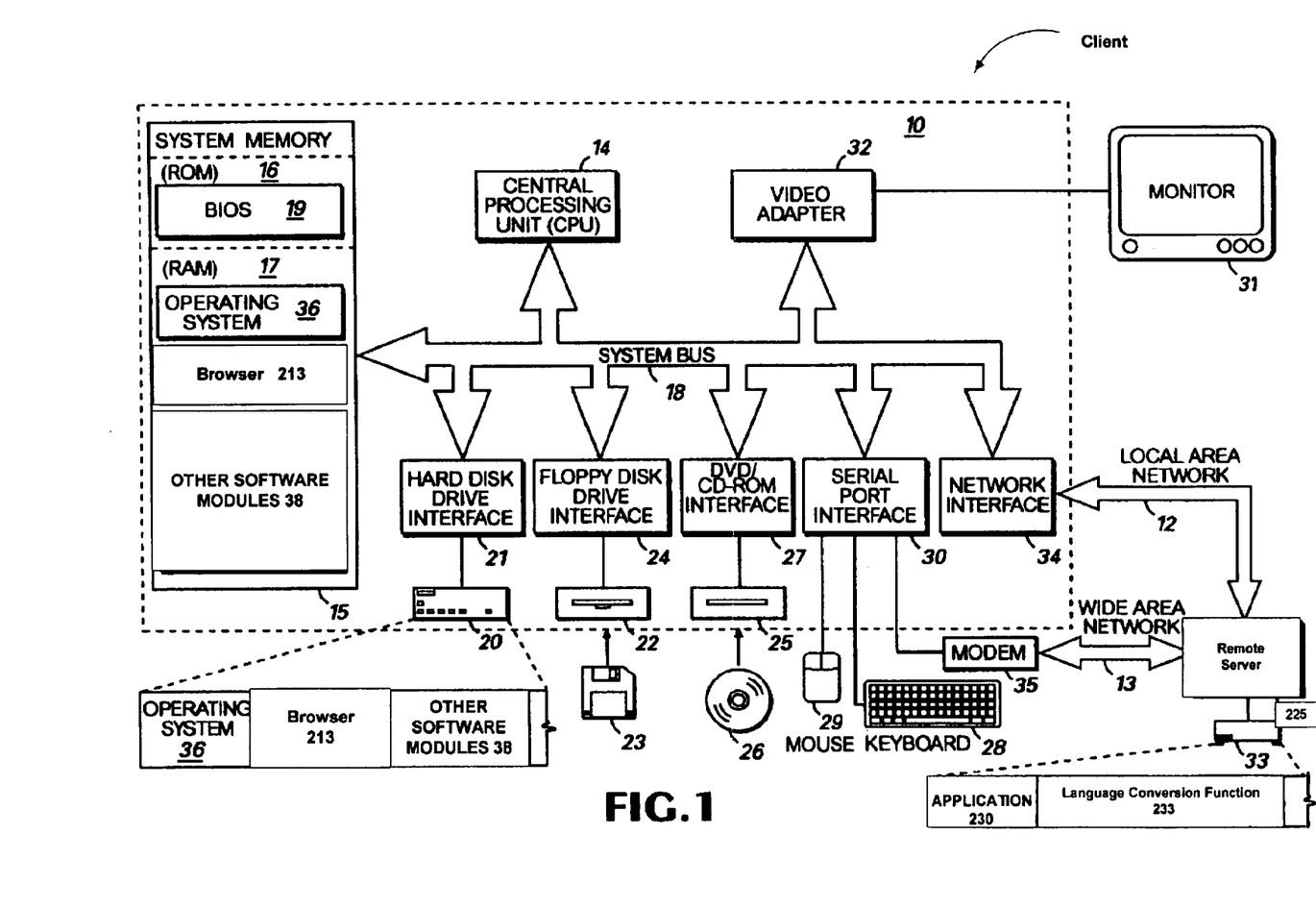
FIG. 1 is a functional block diagram illustrating the operating environment for an exemplary embodiment of the present invention.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote server 225. The logical connections between the personal computer 10 and the remote server 225 are represented by a local area network 12 and a wide area network 13. Those of ordinary skill in the art will recognize that in this client/server configuration, the remote server 225 may function as a file server or computer server.

The personal computer 10 includes a CPU 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 225 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules such as an application 230 and a language conversion function 233 are provided to the remote server 225 via computer-readable media. The personal computer 10 is connected to the remote server 225 by a network interface 34, which is used to communicate over the local area network 12.

As shown in FIG. 1, the personal computer 10 is also connected to the remote server 225 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the fun personal computer 10, those of ordinary skill in the art can recognize that the modem 35 may also be internal to the personal computer 10, thus communicating directly via the system bus 18. It is important to note that connection to the remote server 225 via both the local area network 12 and the wide area network 13 is not required, but merely illustrates alternative methods of to providing a communication path between the personal computer 10 and the remote server 225.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, browser 213, other software modules 38, and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system and programs.

Figure 2:
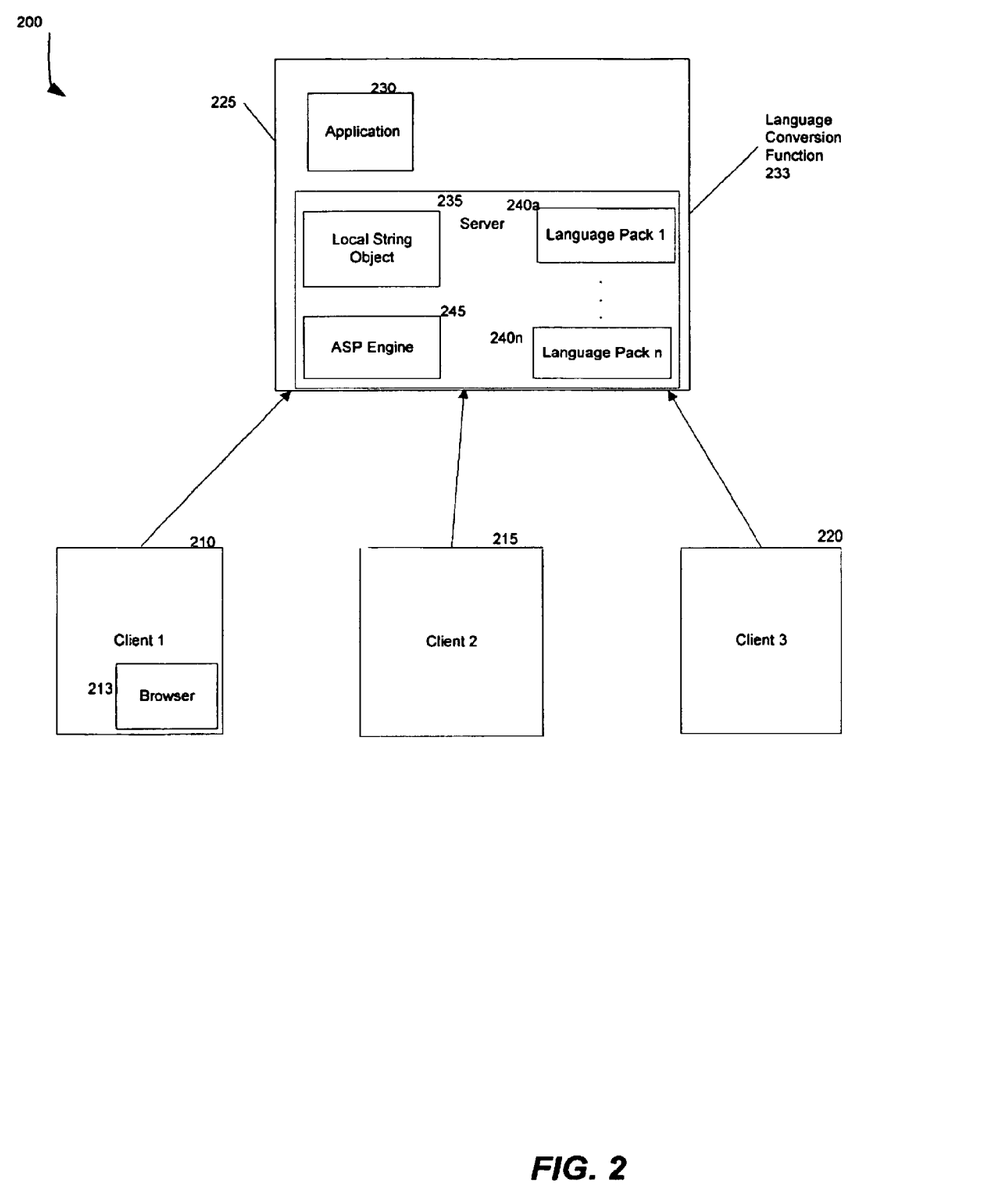
FIG. 2 is a functional block diagram illustrating the architecture of a distributed computer network in accordance with an exemplary embodiment of the present invention.

Referring now to FIG. 2, an exemplary architecture of the present invention will be described. FIG. 2 illustrates an exemplary system 200 for providing a localizable application. The system 200 includes clients 210, 215, and 220 and a server 225 and comprises a distributed computing environment. The server 225 receives digital signals from and sends digital signals to the clients 210, 215, and 220, typically via a distributed computer network, such as the Internet. A browser 213 enables client 1 210 to present digital content, based upon digital signals transmitted from the server 225. The server further comprises software modules including an application 230 and a language conversion function 233. The language conversion function comprises a local string object 235, an Active Server Page Engine 245, and language packs 240a through 240n.

Using the browser 213, client 1 210 can access an application 230 on the server 225. The local string object 235 determines the language the application 230 will be converted into based upon a client language preference. A language pack 240a is selected that matches the language selected by the local string object 235. The language pack 240a provides a translation for the content of the application 230. The translated content for the application 230 is then sent to the client 210 by the Active Server Page Engine 245 in a form that can be understood by the client.

Figure 3:
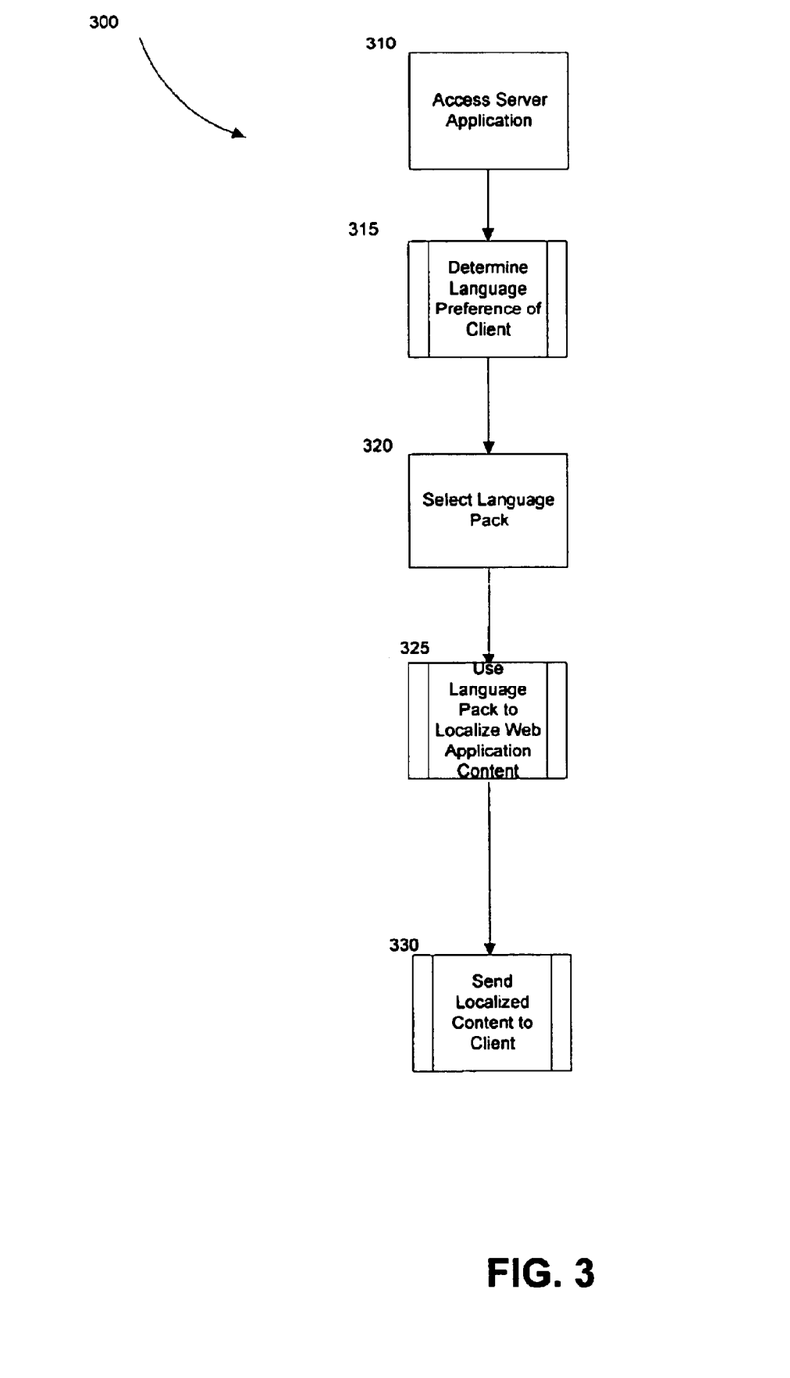
FIG. 3 is a logic flow diagram illustrating an overview of an exemplary process for converting a Web application into a language selected by a client.

FIG. 3 is a logic flow diagram illustrating an overview of exemplary steps for a language localization process. Referring now to FIGS. 2 and 3, a process 300 begins at step 310 with client 1 210 accessing an application 230 on a server 225. In step 315 the client's language preference is determined at the server 225. Once the client's language preference is determined, the local string object 235 selects the language pack 240a that supports the preferred language in step 320. In step 325 the selected language pack 240a supplies all of the localizable elements in the application 230. In step 330, the server 225 sends the localized application to the client 1 210.

Figure 4:
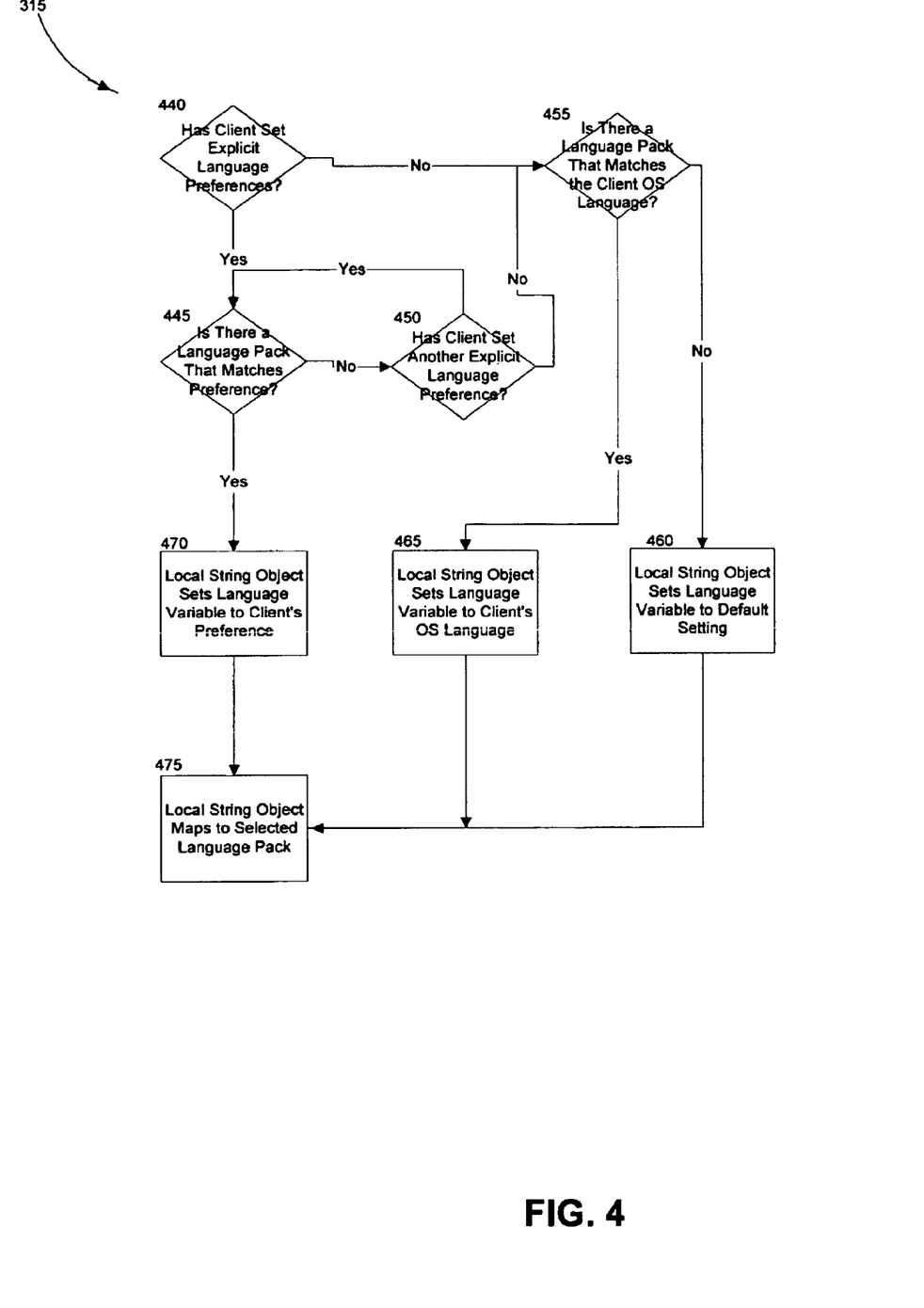
FIG. 4 is a logic flow diagram illustrating an exemplary process for determining a client's language preference.

FIG. 4 is a logic flow diagram illustrating in more detail the exemplary steps for determining a client's language preference as represented in step 315. Beginning with step 440, the local string object 235 looks to the browser 213 to determine whether the client 210 has set an explicit language preference. If client 1 210 has set explicit language preferences, they will be contained, in order of preference, in a signal that the browser 213 sends to the server 225 at the time of the initial access. If client 1 210 has not set an explicit language preference, the "No" branch is followed to step 455. If client 1 210 has set an explicit language preference, the "Yes" branch is followed to step 445. The local string object determines in step 445 whether there is a language pack that supports client 1's explicit language preference.

If there is a supporting language pack, the "Yes" branch is followed from step 445 to step 470. The local string object 235 in step 470 sets a language variable to the client's language preference. If in step 445 there is no matching language pack, the "No" branch is followed to step 450 where the local string object 235 determines whether the browser 213 has transmitted other explicit language preferences for client 1 210. If client 1 210 has made other explicit language preferences, the "Yes" branch is followed back to step 445 and this loop continues until either an explicit language preference is matched to a language pack or client 1's preferences are exhausted. When the explicit language preferences are exhausted in step 450, the "No" branch is followed to step 455.

If step 455 is reached, client 1 210 does not have explicit language preferences and, consequently, the browser 213 transmits the operating system language of the client 1 210 to the server 225. The local string object 235 determines whether there is a language pack that matches the client 1 operating system language. If there is a language pack matching the operating system language, the "Yes" branch is followed to step 465 and the language variable is set to correspond with the client 1 operating system language. If there is no language pack that matches the client 1 operating system language, the "No" branch is followed to step 460 and the local string object 235 sets the language variable to a default setting predetermined by the server.

In step 475 the local string object 235 looks at a list of the language packs on the server 3 and selects the language pack 240a corresponding to the language variable. This language pack 240a will be used to convert, or localize, the string elements in the application into a particular language. Each language pack on the server contains the string conversions for a language.

Figure 5:
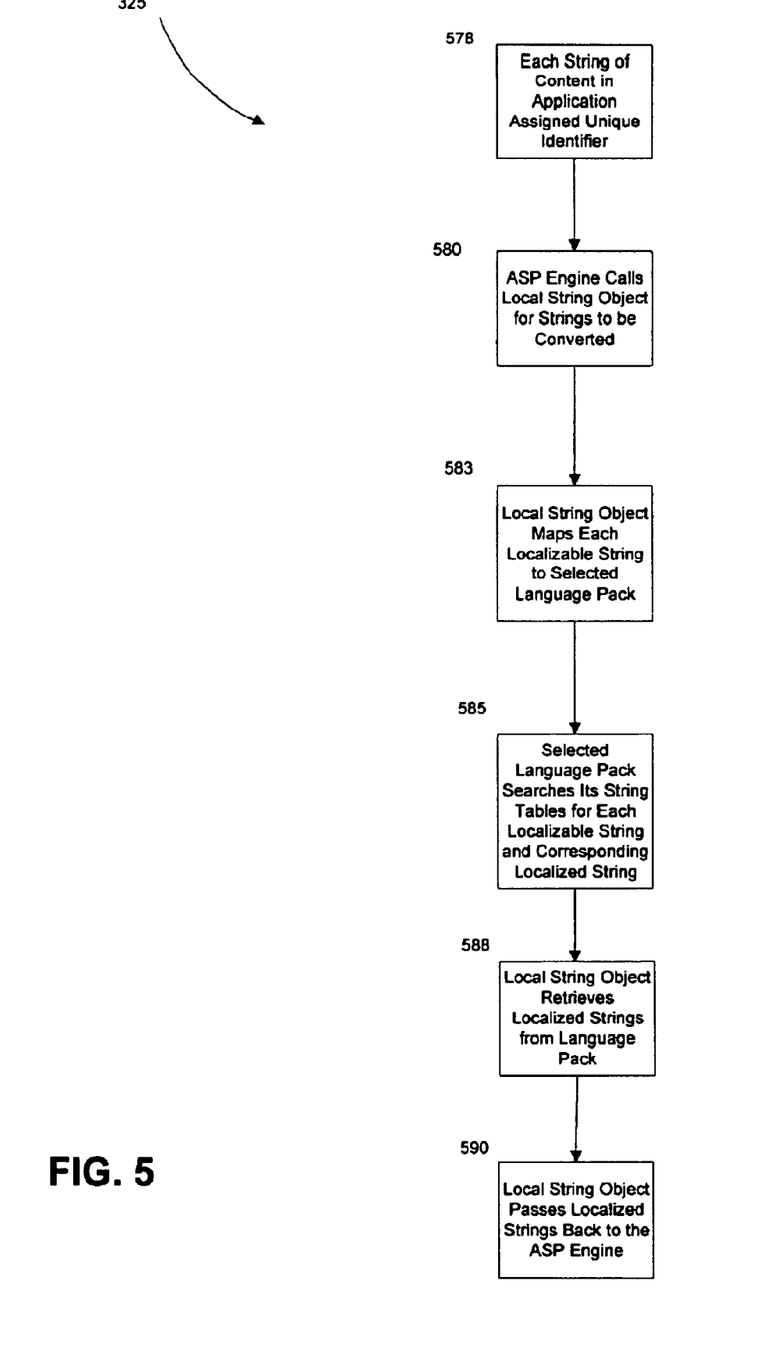
FIG. 5 is a logic flow diagram illustrating an exemplary process for localizing a Web application with a language pack.

FIG. 5 sets forth in greater detail the process represented by task 325. Referring to FIG. 5, in step 578, each string of content in the application 230 is assigned a unique identifier. The unique identifier is used to locate the string in a table located within the selected language pack. In step 580, the ASP Engine 245, which renders the application content, calls the local string object for the localizable strings of content to be mapped. In response, the local string object maps the localizable strings of content in step 583 to the selected language pack 240a. Essentially, the mapping process is a search in the language pack for the string elements that make-up the application and their corresponding words or symbols in a specific language. In step 585, the language pack 240a searches its string tables for the unique identifier of each localizable string and the corresponding localized string. Once located, the local string object retrieves the localized strings from the from the language pack 240a in step 588. In step 590, the local string object 235 passes the localized strings back to the ASP Engine 245.

Figure 6:
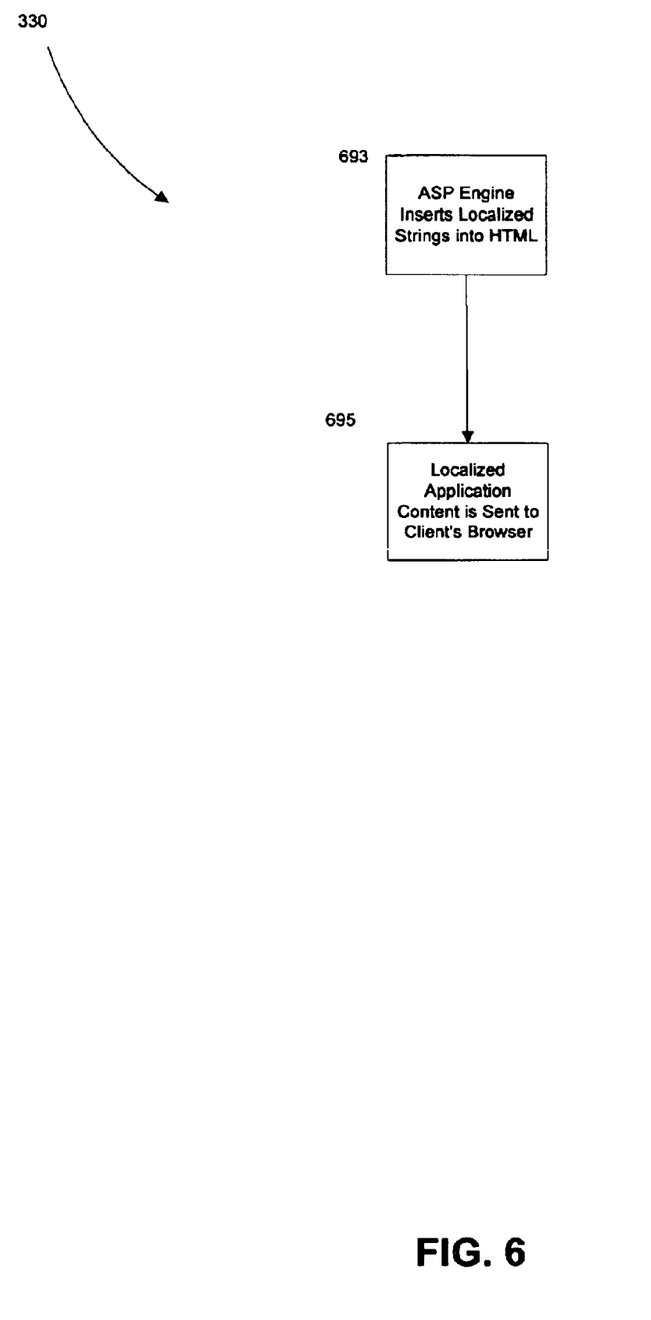
FIG. 6 is a logic flow diagram illustrating an exemplary process for sending a localized application to a client.

The steps represented in task 330 are set out in greater detail in FIG. 6. FIG. 6 illustrates the last phase of the process, actually transmitting the application content from the server 225 to client 1 210 in the desired language. In step 693, the ASP Engine 245 renders the application content in the selected language. This is typically accomplished by inserting the localized strings from the language pack 240a into HTML. Finally, the server 225 sends the localized application to the client's browser 213 as HTML content in step 695.

Client 1 210 now has the application 230 in a language it can understand. At the same time, another client 215 may retrieve the application 230 in a different language. While they are using the application 230, the clients 210 and 215 may change the language in which they are viewing the application by changing their language preference. A language pack 240n for the newly selected language translates the application 230 and then sends the newly translated version to the client. Only one version of the application 230 exists on the server 225 to facilitate any changes that need to be made. The variety of languages into which the application can be translated is controlled by the various language packs installed on the server.

Those skilled in the art will appreciate that the invention has a wide range of applications beyond the environment of the World Wide Web. This method of language localization could be utilized in other types of distributed computing networks where there is a need to express content in varying languages. This method can also be used in a situation where the application resides on a personal computer and localization occurs either on the personal computer or on another logically connected computer.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A method for receiving an application in a desired language from a server comprising the steps of:

using a client to access the application on the server;

determining a language preference for the client;

converting the content of the application to the client's language preference by using a selected one of the language pack software modules on the server corresponding to the language preference, wherein the converting further comprises:

assigning a unique identifier to each string of content in the application:

calling a local string object with an indication of strings of content to be converted based on the unique identifier for each string;

mapping each string to be converted to the selected language pack;

searching the selected language pack using the unique identifiers of the strings to be converted to locate corresponding localized strings;

retrieving the localized strings from the selected language pack; and passing the localized strings to an ASP Engine.

2. The method of claim 1, wherein the transmitting the converted content of the application further comprises:

inserting the localized strings into HTML with an ASP Engine at the server; and sending the application content with the localized strings from the server to a client browser.

3. A system for providing localized application content from a server to a client, the server comprising:

a local string software module residing on the server and operable for determining a client's language preference wherein the local string software module is further operable for assigning a unique identifier to each string of content in the application; and a plurality of language pack software modules residing on the server, each corresponding to a language and operable to convert the content of the application into a different language wherein an Active Server Page Engine is further operable for calling to the local string software module with the strings of content to be converted based on the unique identifier assigned to each string.

4. The server of claim 3, wherein the local string software module is further operable for mapping localizable strings from the application to the selected language pack software module.

5. The server of claim 4, wherein the mapped language pack software module locates localized strings for the unique identifiers representing the localizable strings.

6. The server of claim 4, wherein the local string software module is further operable for retrieving localized strings from the mapped language pack software module.

7. The server of claim 6, wherein the local string software module is further operable for passing localized strings back to the Active Server Page Engine.

8. The server of claim 7, wherein the Active Server Page Engine is further operable for compiling ha localized client application and forwarding it to the client.

* * * * *